United States Patent [19]

Doljack

[11] Patent Number: 5,349,165
[45] Date of Patent: Sep. 20, 1994

[54] INDUCTION HEATER SYSTEM FOR FUSING PLASTICS

[75] Inventor: Frank A. Doljack, Pleasanton, Calif.

[73] Assignee: Gas Research Institute, Chicago, Ill.

[21] Appl. No.: 868,876

[22] Filed: Apr. 16, 1992

[51] Int. Cl.⁵ .............................................. H05B 6/10
[52] U.S. Cl. .................... 219/633; 219/660; 219/670
[58] Field of Search ............ 219/10.57, 10.75, 8.5, 219/9.5, 10.79, 10.53, 85.11, 603, 611, 616, 633, 670, 660

[56] References Cited

U.S. PATENT DOCUMENTS

| | | | |
|---|---|---|---|
| 4,017,701 | 4/1977 | Mittelmann | 219/10.79 |
| 4,521,659 | 6/1985 | Buckley et al. | 219/10.53 |
| 4,675,487 | 6/1987 | Verkasalo | 219/10.79 |
| 4,745,264 | 5/1988 | Carter | 219/10.75 |
| 5,107,095 | 4/1992 | Derbyshire | 219/85.11 |

FOREIGN PATENT DOCUMENTS

0241597 10/1987 European Pat. Off. .
86847 3/1990 Japan .
WO80/02124 10/1980 PCT Int'l Appl. .

*Primary Examiner*—Philip H. Leung
*Attorney, Agent, or Firm*—Speckman, Pauley & Fejer

[57] ABSTRACT

A heater system provides a portable lightweight tool including the core and at least the primary winding of a transformer having a secondary that may be permanently or selectively coupled to a heater having a bifilar winding to reduce magnetic radiation; wherein the design of the system is such that voltages produced in the portable tool do not materially exceed 100 volts and are normally below 100 volts. The core of the transformer when employed in an arrangement wherein the secondary winding is permanently connected to the heater winding has a leg rotatable out of the closed core configuration whereby another leg of the core having the primary winding wound thereon may be inserted into the secondary winding. Alternatively the secondary winding may be wound on a short length of the core that is insertable into a leg of the transformer core on which the primary winding is wound.

14 Claims, 6 Drawing Sheets

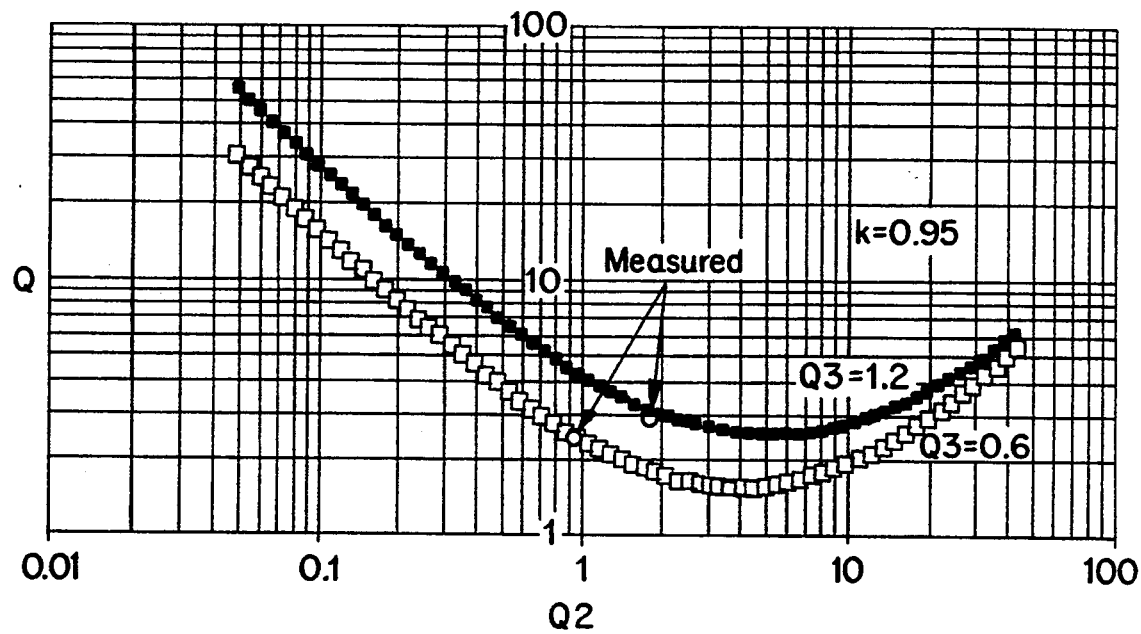
Fig.11
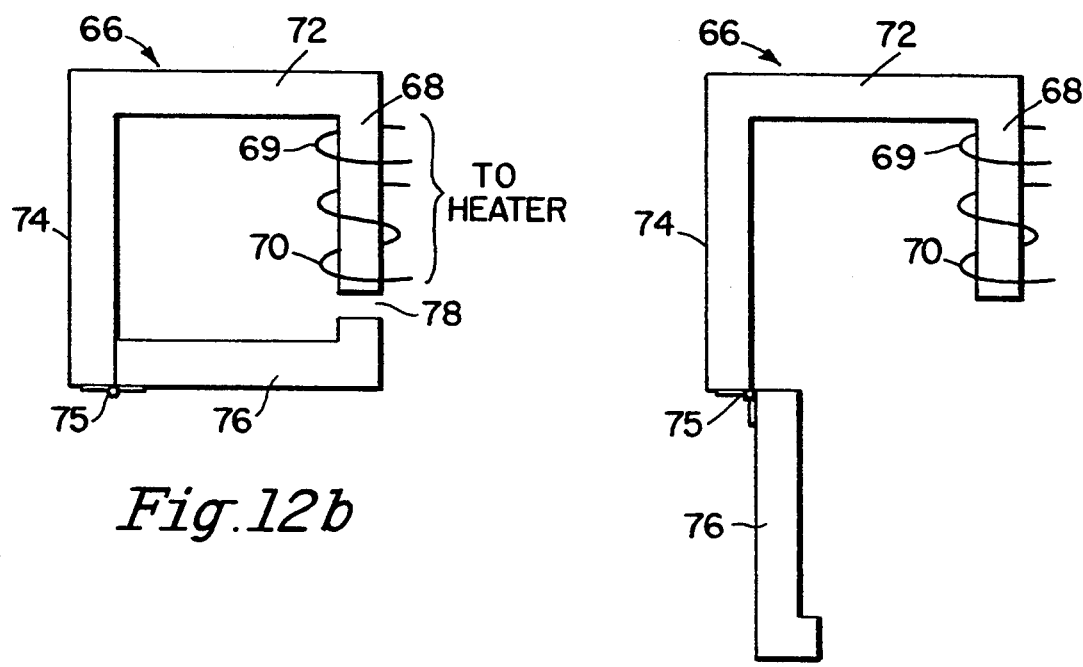
Fig.12b
Fig.12a

2 Loops in series
20 Strands each

8 Loops in series
5 Strands each

4 Loops in series
10 Strands each

INDUCTION HEATER SYSTEM FOR FUSING PLASTICS

TECHNICAL FIELD

The present invention relates to fusion coupling of plastic and more specifically to a portable transformer link coupling apparatus for mating with a heater embedded in plastic couplings, the mechanism being operable with heaters of many different sizes and construction.

BACKGROUND OF THE INVENTION

Clamshell structures for affecting fusion of pipes are well known in the art being disclosed in various documents such as WO80102124 wherein overlapping plastic pipes have a ferromagnetic material located in the overlap region which is excited by a magnetic field carried in a clamshell having a coil therein.

U.S. Pat. No. 4,914,267 discloses a clamshell heater for fusing solder to effect a solder joint between wires.

There are numerous types of clamshell coils or heaters but each is tailored to a specific device, a pipe of a given dimension or other object of given structure and/or dimensions. Thus there must be a clamshell for each such size or shape of structure to be heated or fused, a costly approach and one which becomes unwieldy as the pipes or other structures become large.

A further problem is that it is difficult to achieve close fitting clamshell heaters with a low Q so that the prior devices are relatively inefficient, the voltages are high and a series resonant capacitor is required in all instances. The result of all this is that the clamshell is unwieldy, costly and produces high voltages that must be handled with great care.

A close fitting solenoid coil can provide lower Q's than the clamshell devices but it requires both mechanical and electrical connections and high voltages since the coupling coefficients are not more than 0.6.

The current approaches to fusion coupling do not provide common elements for pipes, saddles, tees or patches so that a special tool is required for each.

OBJECTS OF THE PRESENT INVENTION

It is an object of the present invention to provide a single tool that can accommodate a wide range of heaters both in size, shape and power.

Another object of the invention is to provide a tool structure for effecting fusion coupling of plastic pipes or like uses, that has low electromagnetic radiation.

It is a primary object of the present invention to provide a portable tool and associated circuitry having a low system Q, low inductance, no ohmic contacts and is operable at voltages below 100 volts in the tool.

It is another object of the present invention to provide a fusion coupling system employing a small, portable low cost tool which accommodates many different sizes and configurations of members to be joined; that is, it does not have to be scaled to the size or shape of the structure to be heated.

Yet another object of the present system is to provide a heater system that does not always require a series capacitor, employs inductive coupling to the heater and the inductive device operates at below core saturation.

BRIEF DESCRIPTION OF THE PRESENT INVENTION

The present invention provides a portable tool which may be linked to heaters of many different sizes, configurations, power requirements and fusion couplings. The essential features of such a device are that it is transformer linked to heaters embedded in couplings, it must operate at voltages below 100 volts and it must be able to accommodate heaters of widely different power requirements; for instance, but without limitation, from 500 watts to 1800 watts.

In order to achieve the desired results as set forth above, the fusion coupling system of the present invention must employ a skin effect heater, having an internal Q of between 0.5 to 5 and its transformer must have a secondary winding such that the ratio of its reactance to the resistance of the heater structure is between 1 and 20. The various features of the invention are achieved by employing a heater that is an eddy current, self regulating heater composed of a ferromagnetic or ferromagnetic coated wire that self regulates at its effective Curie temperature. The term "ferromagnetic" as employed herein is used for purposes of simplicity and is intended to cover ferromagnetic, ferromagnetic and like materials that exhibit a marked decrease in magnetic permeability at their effective Curie temperatures. This latter term relates to the fact that a substantial reduction in heating effect occurs at temperatures below true Curie temperature. Effective Curie temperature may be as little as 1° or as great as 100° below true Curie temperature depending upon the ferromagnetic material employed.

To accomplish the objects of the present invention a round cross-section ferromagnetic or ferromagnetic coated wire is employed. A heater employing such a wire has an internal Q of between 0.5 and 5.0. If a bifilar winding is employed internal heater Qs of between 0.5 and 1.2 may be achieved. If a helical heater winding is employed the Q may go as high as 10.

The transformer secondary in the preferred embodiment of the invention is permanently connected and embedded in the structure (usually a plastic) with the heater. The secondary winding must be accessible to the core of the transformer and thus the structure may have the appearance of a coffee mug in which the handle includes the secondary winding.

The secondary of the transformer is chosen such that $Q_2$ the ratio of its reactance to the resistance of the heater is between 1 and 20. With these constraints the objects of the present invention may be met. Ancillary features of the invention that improve the overall performance of the basic system are the use of a soft magnetic core for the transformer, the use of bifilar windings and the disposition of the primary and secondary windings on the same leg of the core to provide a coupling factor of at least 0.95.

The apparatus defined above eliminates the use of external electrical connections and thus the problems incident to achieving proper contact; corrosion, sparking and the like. There may be installations, however, where access to a secondary winding integral with the heater is not physically possible. In such a case the secondary winding may be integral with the primary winding and core and the leads from the secondary winding can be plugged into contacts connected to the heater input leads.

Regardless of the disposition of the transformer secondary winding it is strongly preferred, as indicated above, that it be located on the same leg of the core as the primary winding to provide the required coupling coefficient.

The heater windings may comprise a plurality of cross coupled parallel wires to reduce resistance and a like return arrangement of wires (bifilar windings) to at least partially cancel the external magnetic fields generated to thereby greatly reduce EMI. Many variations of this basic pattern are possible with the resistance of the heater being lowered as the number of wires in each parallel wire group is increased. The heater thus employed may be of the type disclosed in co-pending U.S. patent application Ser. No. 07/657,996 filed by Ross et al on Feb. 20, 1991 for "System and Method for Joining Plastic Materials" the two applications to be assigned to the same assignee.

These heaters are, in the preferred embodiment of the invention, permanently connected to the secondary winding of a transformer and permanently embedded in one of the plastic members to be fused to at least one other such member. The embedded structure is such, however, that the core of the transformer in one embodiment of the invention forming a part of the portable tool and carrying the primary winding may be passed through the turns of the secondary winding to produce the necessary link to couple the embedded members of the system to the external members, thus the term "link coupling". In a second embodiment of the structure where the secondary winding is permanently connected to the heater, a short length of the transformer core is included with the secondary winding in the heater structure, the main body of the core having a gap that snugly receives the short length of core associated with the secondary winding. Alternatively, due to physical constraints, the secondary winding may be a permanent part of the tool and may plug into the heater.

The preferred transformer core material is a low loss ferrite to reduce losses such being the result of the very high resistivity of such material.

The above structure of the heater and the transformer, the latter preferably having a gap in its magnetic core to prevent saturation of the core, lead to a low Q, low inductance and low resistance system and as such low voltages may be employed to provide power of 1800 watts or higher. It should be noted that a low Q requires that the inductive reactance of the system must be low and the resistance high. Therefore a tradeoff occurs between these two factors.

The above and other features, objects and advantages of the present invention, together with the best means contemplated by the inventors thereof for carrying out their invention will become more apparent from reading the following description of a preferred embodiment and perusing the associated drawings in which:

BRIEF DESCRIPTION OF THE DRAWINGS

FIG. 8 illustrates still another form of bifilar heater winding;

FIG. 11 illustrates the results of the test of the structure of FIG. 10;

FIGS. 12a and 12b illustrate a core arrangement that permits insertion of a leg of the core into a secondary winding permanently connected to the heater winding;

DETAILED DESCRIPTION OF THE PRESENT INVENTION

Figure 1:
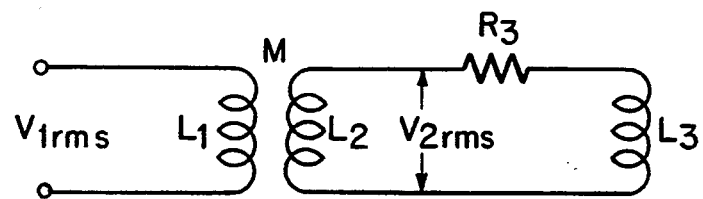
FIG. 1 illustrates a basic transformer-load circuit employed for analysis of the heater system of the present invention.

Referring to FIG. 1 of the accompanying drawings, an analysis is undertaken to demonstrate the approach to achieve a quite low circuit Q.

An analysis of the circuit produces the following initial equation:

$$Z = j\omega L_1 + \frac{(\omega M)^2}{j\omega L_2 + j\omega L_3 + R_3} \quad (1)$$

where $R_3$ is the heater resistance, M is the mutual inductance of the structure, $L_1$ and $L_2$ are the inductance of the primary and secondary windings of the transformer, and $L_3$ is the inductance of the heater. It will be shown how Q can be made quite low and $L_1$ can be designed to be low enough that the exciting voltage can be held low, below 100 volts.

From Equation 1, Equation 2 is developed $$Q = \frac{Q_2^2 + Q_3^2 + 2Q_2Q_3 + 1}{K^2 Q_2} - Q_2 - Q_3 \quad (2)$$

where Q is the Q of the entire circuit, $$Q_2 = \frac{\omega L_2}{R_3} \text{ and } Q_3 = \frac{\omega L_3}{R_3} \text{ and } K = \frac{M}{\sqrt{L_1, L_2}}.$$

Equation 2 can be reduced to:

$$Q = 1 + \frac{2}{Q_2} \quad (3)$$

assuming that both K and $Q_3$ have values of 1 or very close to 1. The factor K is the coupling factor which can be from 0.95 to virtually 1. For a value of $Q_2=2$, $Q_3=1.2$ and $K=0.95$ the Q of the system becomes 2.72.

Figure 2:
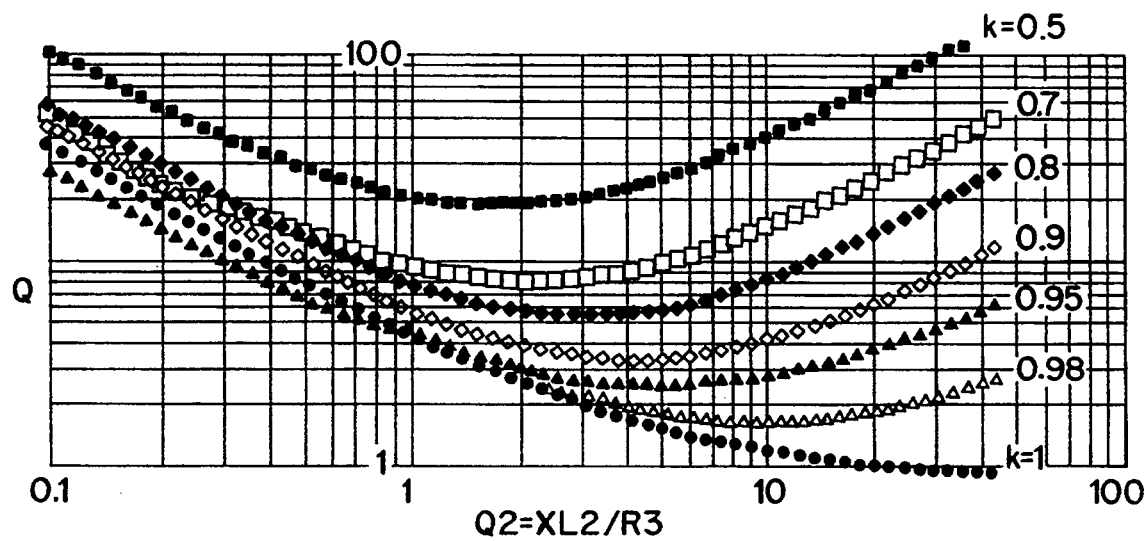
FIG. 2 is a plot of the Q of the heater system of the invention as a function of the inductance of the secondary winding, inductance of the heater, the coupling factor between the primary and secondary windings and the load resistance.

A plot of the value of Q against $Q_2$ with $Q_3=1.2$, is illustrated in FIG. 2 for various values of K. It is seen from FIG. 2 that if $Q_2$ is designed to be between 2 and 10, then Q will be less than 3, an acceptable value.

The value of $Q_3$, the Q of the heater, is determined in part by the inherent internal Q of a round wire from which the heater is fabricated. This factor is set forth in the graph of FIG. 3 in which the curve is the factor $$\frac{\omega L_1}{R_{hf}}.$$

It is noted that the internal Q of the wire is 0.5 at the radius to depth of penetration ratio of 1 of an eddy current, self regulating round wire. At a ratio of 5, the Q becomes a constant of 1. The Q of the heater is increased by its external Q and in the analysis employed to develop the graphs of FIG. 2, a $Q_3=1.2$ was assumed.

It is noted from FIG. 2, that with a maximum value of Q of approximately 3, the ratio of $XL_2/R_3$, that is, $Q_2$ can have a value of 1 to 20 which produces this practical maximum.

Referring now to the design of the system, low voltage in the portable tool can be achieved since a low Q together with complete freedom in design of the inductive reactance $X_{L1}$ readily permits attainment of this end. $Q_2$ is a function among other things, of design of the secondary winding, $Q_3$ will run between 1 and 3, and the resistance $r_3$ is made as low a value as possible. There are limitations, however, in the design of this element as will be seen subsequently. As stated above the factors that can be readily controlled are $Q_2$ and $X_{L1}$. The above statement is summarized in Equation 4 as follows:

$$r_1 = \frac{K^2 Q_2}{Q_2^2 + Q_3^2 + 2Q_2 Q_3 + 1} X_{L1} \quad (4)$$

from which Equation 1 was derived. As indicated immediately above $Q_2$ and $X_{L1}$ are the readily controllable parameters and these are now discussed.

$$V_{1RMS} = \sqrt{P_h r_1 (1+Q^2)} \quad (5)$$

where $P_h$ is the power generated in the heater.

Figure 4:
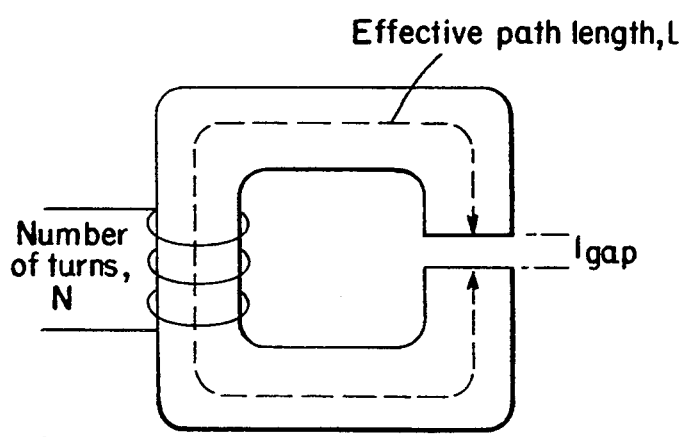
FIG. 4 is a diagram of a core to be employed with a primary winding wound on one leg thereon.

Reference is now made to FIG. 4 which illustrates a design of the primary winding and the ferrite core useful in analyzing the design of the system parameters.

It can be shown that for the structure illustrated in FIG. 4

$$NA = \frac{L I_{max}}{B_{max}} \quad (6)$$

where N is the number of turns of the primary winding, A is the cross-sectional area of the ferrite core, L is the inductance of the primary winding and $B_{max}$ is the maximum flux density in the core where the core is operating over a linear region below saturation. To achieve the maximum current required without producing saturation it is often required to introduce an air gap in the core, such a gap designated in FIG. 4 as 1 gap. In the above equation, L is taken to be $$\frac{N^2 \mu \mu_0 A}{1 + \mu \big|_{gap}}.$$

The factor $\mu_0 = 4\pi \times 10^{-7}$ MKS units. $B_{max}$ and $\mu$ are determined by the core chosen.

Reference is made to Table 1 which sets forth target values for three heater powers with the system operated at 300 KHz. This table presumes a $Q_3=1.2$, a $Q_2$ of about 5, $L=1.35$ microhenries and $K=0.95$. The calculation to produce this table assumed $B_{max}=0.2$ Tesla and $\mu=3000$. The material used is a ferrite supplied by TDK and designated H7C4. The power dissipated per volume at 0.2 Tesla and 300 KHz is 2.5 watts/cm³ in the core.

TABLE 1

| Power (watts) | L (micro H) | $X_T$ (ohms) | r (ohms) | $I_{rms}$ (amps) | $V_{rms}$ (volts) |
|---|---|---|---|---|---|
| 550 | 1.35 | 2.54 | 0.29 | 43.5 | 34.5 |
| 900 | 1.35 | 2.54 | 0.29 | 55.6 | 44.2 |
| 1800 | 1.35 | 2.54 | 0.29 | 78.6 | 62.5 |

It is noted that the rms voltage at maximum power is well below 80 volts, a reference level set by electrofusion technology.

Referring to Equation 6, $I_{max}$ may be at least 1.4 times $I_{rms}$, NA is taken as 742.5 mm² and using various combinations of l, $l_{gap}$, A and NB, Table 2 is generated.

TABLE 2

| l = | 300 mm | yield | $I_{max}$ = | 135 amps |
|---|---|---|---|---|
| $l_{gap}$ = | 5 mm | | $V_{max}$ = | 339 volts |
| A = | 150 sq mm | | L = | 1.33 micro H |
| N = | 6 turns | | | |

It can be seen that with the factors chosen as set forth above the factors permitted by the structure $I_{max}$, $V_{max}$ and L are well above those required to produce the desired heating wattage set forth in Table 1 above. The core tested was not more than 3½ inches on a side with a cross-section of ½"×½". The total power dissipated would be 113 watts if operated at the maximum current which it would not be. The maximum values required to produce the desired powers are $I_{max}=78.6$A, $V_{max}=62.5$ V and $L=1.33$ microH.

The above calculations demonstrate that a relatively small application tool can operate on even large couplings of high wattage.

The final design criteria is determined by the heater per se.

To minimize external flux radiation bifilar windings may be employed. To provide a low value of resistance each leg of the heater winding is made up of several parallel wires. To prevent the current from concentrating in only one of the wires, cross members are arrayed along the lengths of the parallel wires. These wires also add strength to the structure.

Figure 5:
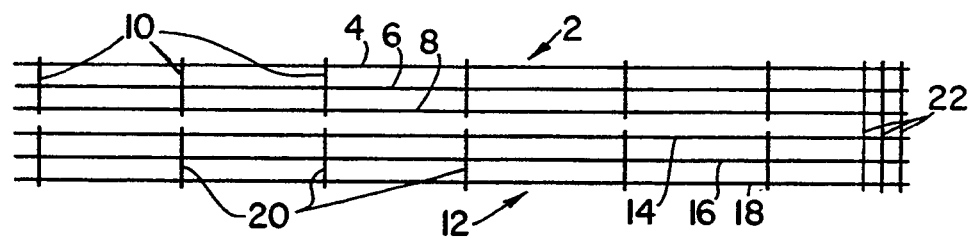
FIG. 5 illustrates one form of bifilar heater winding.

Reference is now made to FIG. 5 of the accompanying drawings for an illustration of a bifilar winding according to the present invention. The winding comprises a first section 2 comprised of three parallel wires 4, 6 and 8 interconnected by cross-wires all designated by the reference numeral 10. A second section 12 together with section 2 completes the bifilar winding. The section 12 also has three lengths of parallel wires, designated 14, 16 and 18 with cross-wires all designated by the reference numeral 20. The first and second sections 10 and 20 are illustrated as cross coupled by three wires designated by numeral 22.

Figure 6:
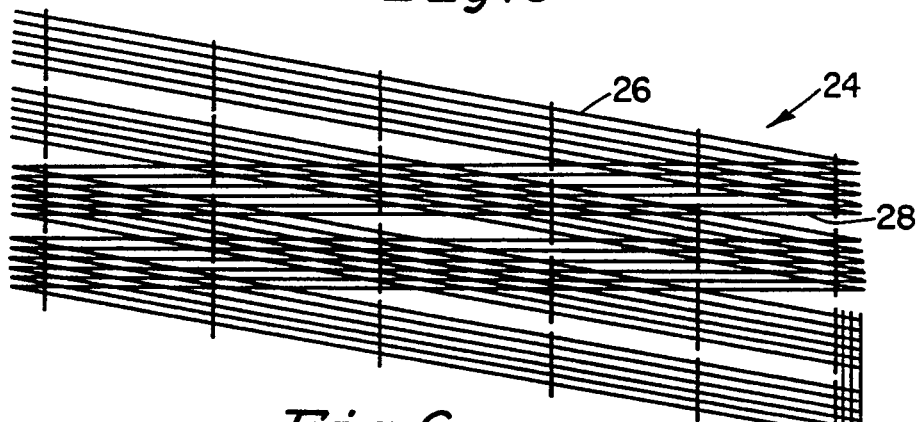
FIG. 6 illustrates a second form of bifilar heater winding.

The three wire bifilar system provides low resistance, low inductance and low magnetic radiation. A scheme having even lower resistance is illustrated in FIG. 6 which employs six wires in each section. The windings 24 or legs 26, 28, etc. of the winding are wound in a spiral fashion and as in FIG. 4 each pair of legs of the winding are shorted together at one end. The crosswires may be replaced by periodically crossing one of the wires in a leg over the others and spot welding it to the others to provide essentially the same operation as the use of cross wires.

Figure 7:
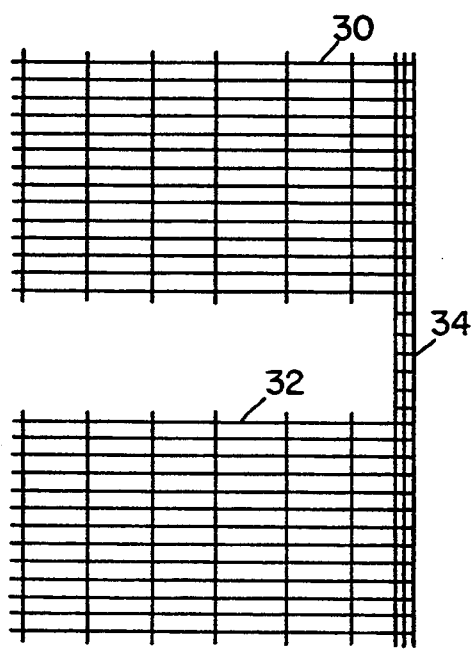
FIG. 7 illustrates a birdcage bifilar heater winding.

Referring to FIG. 7 two birdcage heaters 30 and 32 of the general type disclosed in the aforesaid Ross et al application, may be connected at one end of each by wires 34 to provide the two sections of the bifilar winding. The disclosure of the Ross et al application Ser. No. 07/657,996, relating to the birdcage windings is incorporated herein by reference. These two birdcages can encircle the member to be heated providing a very low resistance and a bifilar effect.

Figure 8A:
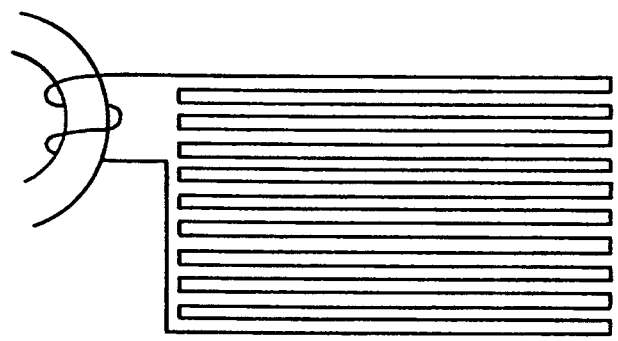
FIG. 8a illustrates multiple bifilar windings.

FIG. 8a illustrates a plurality of serially connected bilfilar windings that may be employed in the present invention.

Figure 8B:
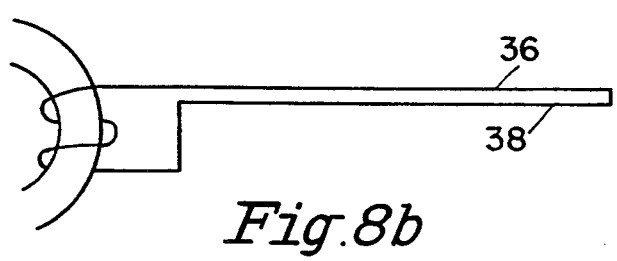
FIG. 8b illustrates a single bilfilar winding.

A basic single wire bifilar winding is illustrated in FIG. 8b and comprises a wire or leg 36 and return wire 38. This figure is illustrated for purposes of analyzing the graphs of FIG. 9.

Figure 9:
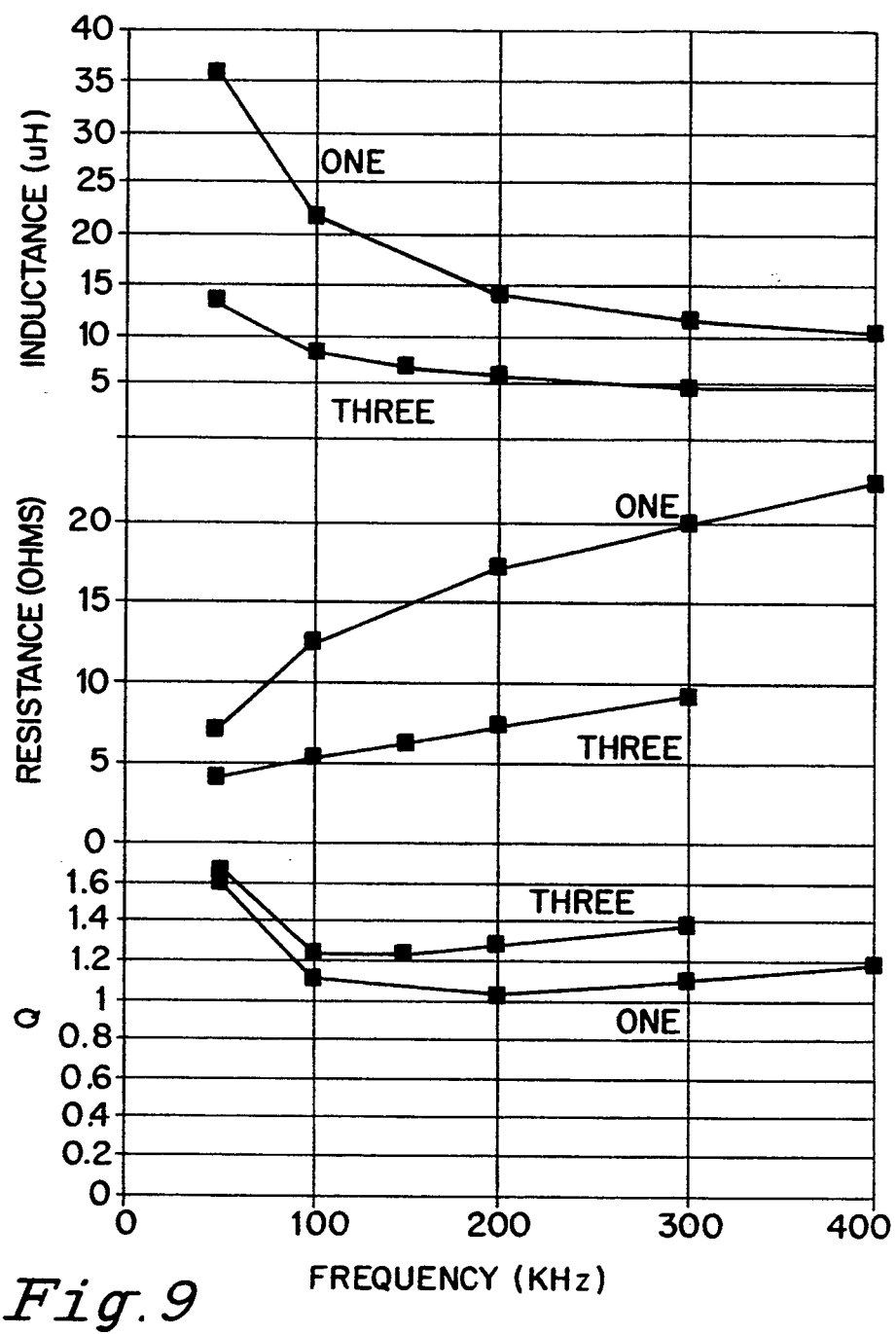
FIG. 9 provides three graphs, inductance, resistance and Q of the heater winding as a function of frequency of the supply.

The three graphs of FIG. 9 compare like performance of the bifilar windings of FIG. 4 and FIG. 7b as a function of frequency, each heater being five feet long. It is readily apparent from these graphs that the inductance and the resistance of the three wire heater are consistently lower than those for the single wire heater. The Q of the three wire heater is greater than that of the single wire heater but the difference even at 300 KHz is only 1.27 times that of the single wire heater. The resistance and inductance of the single wire heater on the other hand are roughly two to three times that of the three wire heater.

Figure 10:
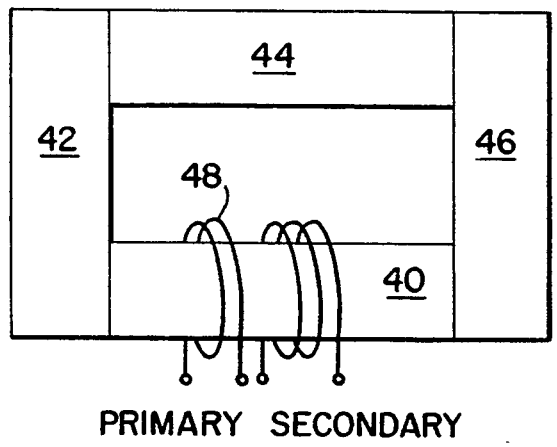
FIG. 10 illustrates an experimental core and winding arrangement.

The above equations have basically defined a system according to one embodiment of the present invention. Reference is made to FIG. 10 of the accompanying drawings. Rectangular soft ferrite blocks 40, 42, 44 and 46 were taped together to form an ungapped core. Each block measured 2⅛×13/16×11/32 inch. The primary winding 48 had two turns and secondary winding 50 had three turns. The secondary winding was connected to the three wire heater of FIG. 4. Measurements were made at 100 KHz using a Digibridge. Measurements were $L_1 = 5.27$ microH and $L_2 = 11.9$ microH. The coupling coefficient separately measured was 0.96 with the windings on the same leg and adjacent one another. Table 3 presents the results of the test with and without a 4 ohm carbon resistor in series with the heater.

TABLE 3

|  | L (uH) | Q | R (ohms) | $Q_2$ | $L_3$ (uH) | $Q_3$ | $R_3$ (ohms) |
|---|---|---|---|---|---|---|---|
| heater | 2.53 | 2.82 | 0.56 | 1.83 | 8.10 | 1.24 | 4.13 |
| w/4 ohms | 3.25 | 2.32 | 0.875 | 0.93 | 8.09 | 0.63 | 8.11 |

Figure 3:
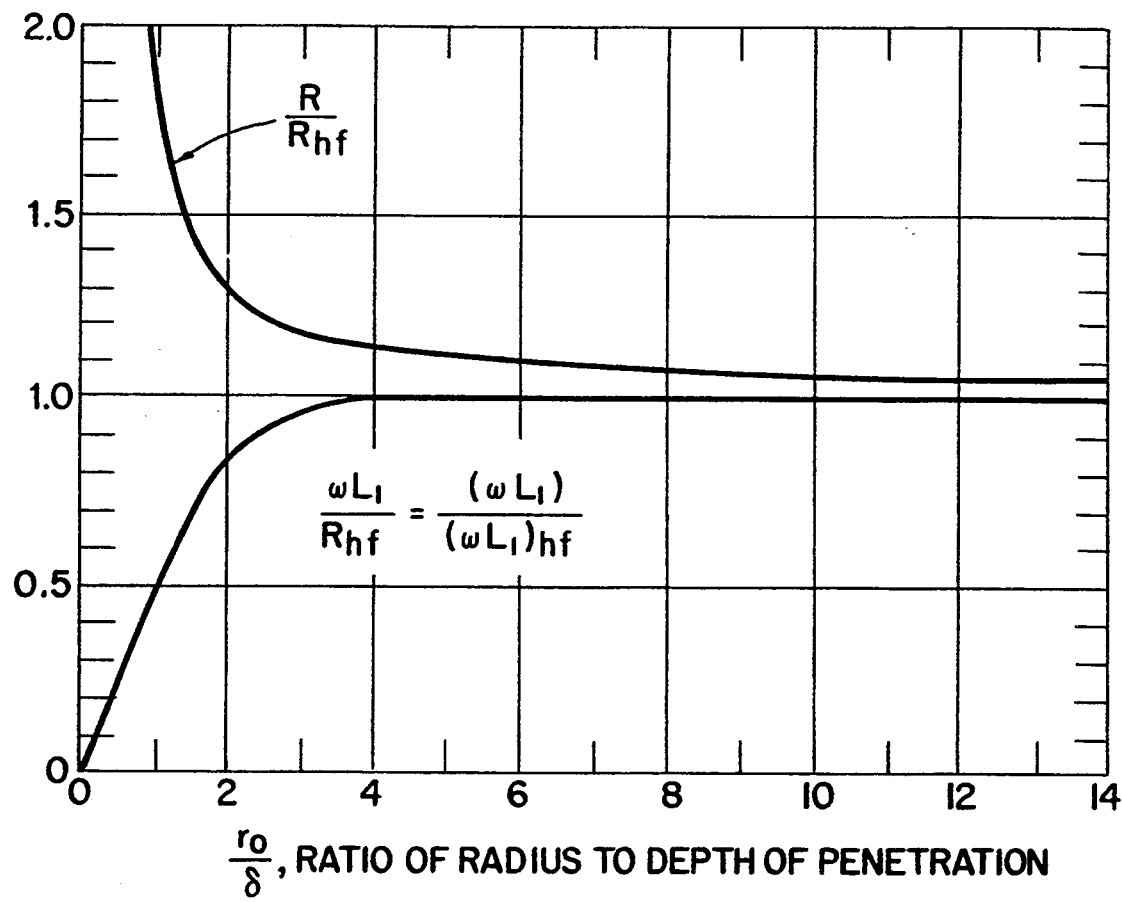
FIG. 3 is a plot of the effect of solid wire skin effect quantities or the internal Q of a round wire.

Referring to FIG. 11 a plot of experimental data corresponding to that of calculated date in FIG. 3, shows a very close correlation of the two graphs. Of importance is the fact that all of the objectives of the invention have been met by even the crude model of FIG. 10.

There is a tradeoff between system Q and system resistance in determining which parameter has the greatest effect on input voltage. An examination of Equation 5 indicates that system resistance has less effect on input voltage than Q since this latter term is squared. Thus in the design of the heater of the present invention, it is preferable to minimize Q even if this means that system resistance is raised.

In an alternative arrangement as illustrated in FIGS. 12a and 12b of the accompanying drawings, the secondary winding is a part of the permanent installation and the core is hinged to permit the core to be inserted into the secondary winding. In FIG. 12a the core comprises a generally U-shaped member 66 having a short leg 68 that passes through secondary coil 70, a base leg 72 and a long leg 74 generally parallel to leg 68. Hinged to the bottom of leg 74 by hinge 75 is a leg 76 generally parallel to leg 72 and in the form of an "L".

A gap 78 is formed between the part 80 of leg 76 that is parallel to leg 74 and the end of leg 68. A primary winding is preferably disposed on leg 74 or 72 to produce closer coupling to coil 70. The coil 70 is illustrated as having two turns but it may have as little as one turn or in some unusual cases, three turns.

When it is desired to insert the core 66 into the secondary winding 70, the leg 76 is rotated downwardly as illustrated in FIG. 12b so that the leg 68 may be readily inserted into the coil 70. Once leg 68 is inserted, leg 76 is rotated back into the position illustrated in FIG. 12a. A latching mechanism (not illustrated) is provided for leg 76 and mating of the legs 74 and 76 must be to very tight tolerances to achieve all that is available from this structure.

Figure 13:
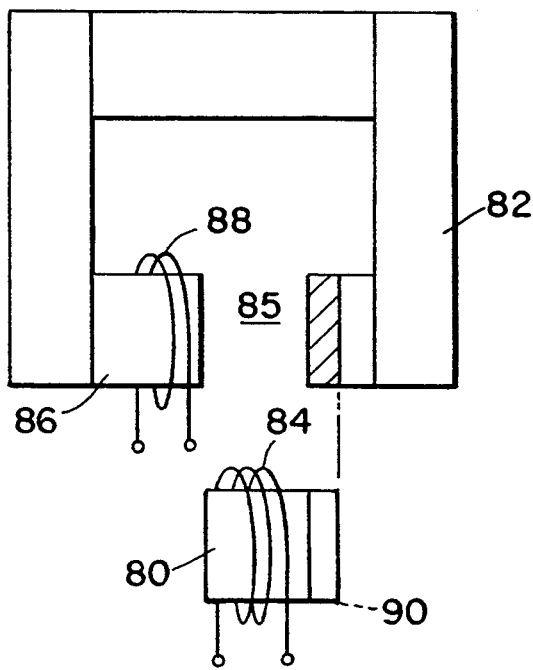
FIG. 13 illustrates an alternative arrangement for coupling a secondary winding of the transformer employed, to the core of the transformer.

Referring now to FIG. 13 there is illustrated an alternative arrangement for permitting a secondary winding of the transformer that is permanently connected to the heater to be inserted in the core. Specifically, a part 80 of core 82 is permanently associated with secondary winding 84. The core 82 has a gap 85 in leg 86 carrying primary winding 88. The gap 85 is as wide as the core part 80 so that the part 80 is snugly received between the two sides of the core defining the gap. If a gap is desired in the core, a region 90 of the core part 80 may be paramagnetic thus defining the desired gap. If a gap is not desired, then all of the core part 80 is a ferromagnetic or ferrimagnetic.

An advantage of the construction of the transformer of FIG. 13 as opposed to the transformer of FIG. 12 is that in the latter Figure the leg on which the secondary is wound need not be straight. The core of the device of FIG. 13 may be circular, triangular or other geometric shape so long as the section of the core on which the secondary is wound is snugly received in the remainder of the core immediately adjacent the primary winding. It should be noted that the core of FIG. 12 could also be curved but such configuration would not be as convenient as straight legged cores.

Figure 14:
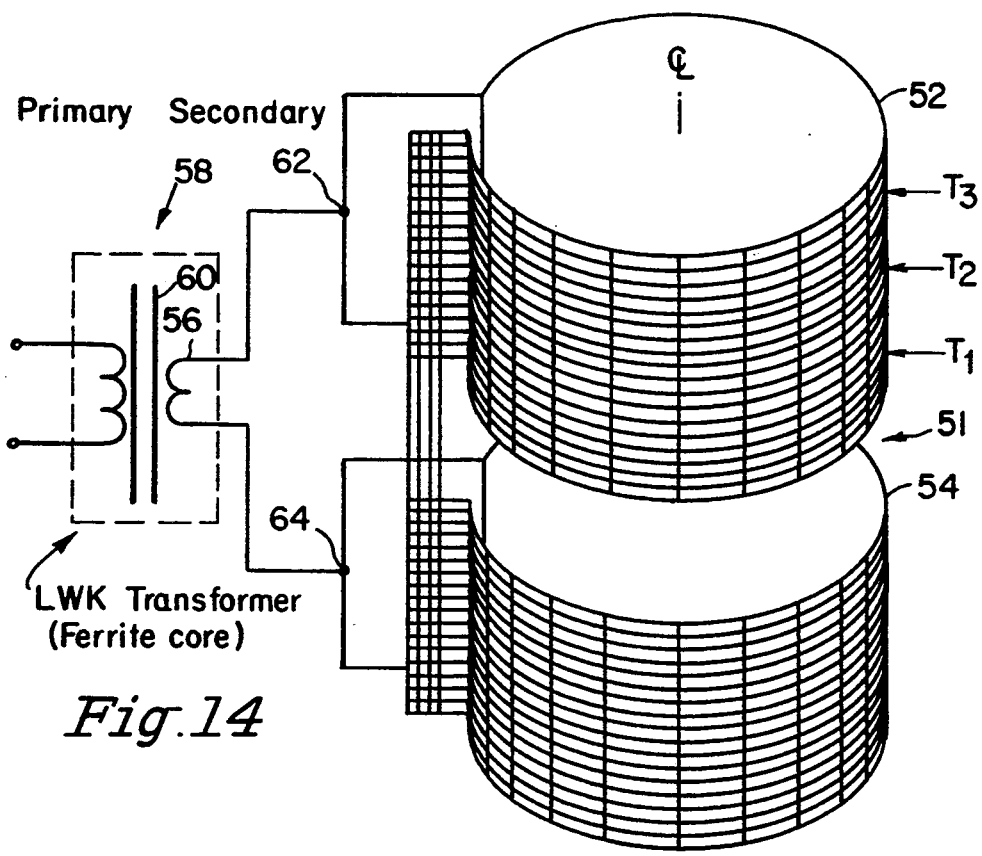
FIG. 14 illustrates a birdcage heater and transformer connection arrangement.

Referring now to FIG. 14 of the accompanying drawings, a heater 51 comprised of two birdcages 52 and 54 arranged to form a bifilar arrangement is excited by a secondary winding 56 of transformer 58 having a soft ferrite core 60 of the type illustrated in FIG. 9 or 12a. The birdcages are arranged as illustrated in FIG. 6 but are formed into cylinders, see FIG. 14. In this particular arrangement, the secondary winding 56 forms part of the portable tool and is connected in conventional fashion to terminals 62 and 64 of the heater.

Figure 15A:
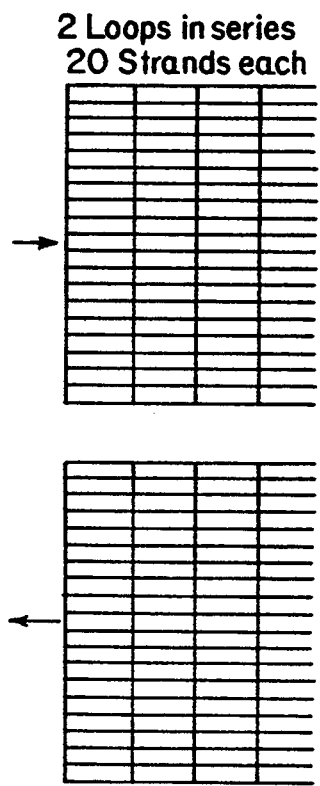
FIGS. 15a, 15b and 15c illustrate three different heater configurations tested to provide the data for Table 4.
Figure 15B:
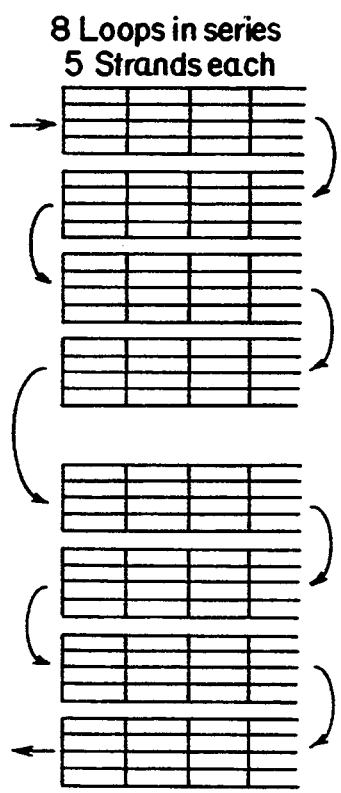
Figure 15C:
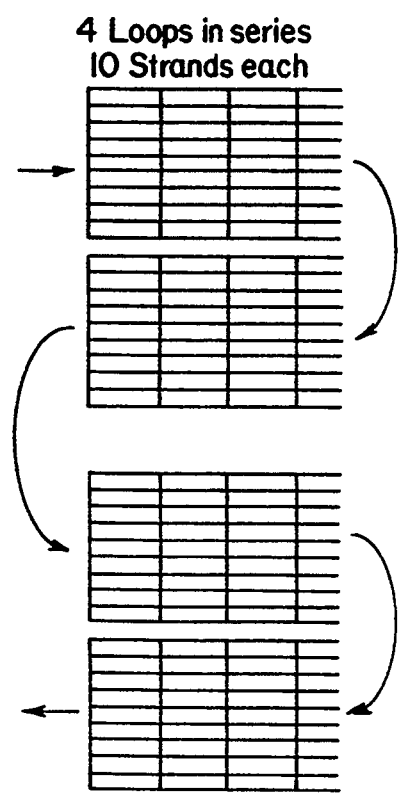

FIGS. 15a, b and c illustrate three different heater configurations as indicated in the drawings and tested for the various parameters set forth in Table 4 below. The tests were conducted at low power at 350 KHz with a two turn primary and one and two turn secondaries. A series resonating capacitor to lower the Q of the circuit was then connected in series in the primary winding circuit. The heaters were then operated in air at high power and all three ran at startup at about 2500 watts out of the outlet giving about 2000 watts at the link system. Equbrium was reached at about 1500 watts at the outlet. If operated in a plastic sleeve the wattage would have been 1800 watts.

TABLE 4

| Heater Type | Heater Inductance | Heater Resistance | $Q_3$ | $Q_2$ | Q | $r_1$ | Calc. $V_{rms}$ 1800 watt |
|---|---|---|---|---|---|---|---|
| Version 1 1 turn secondary | 0.4 µH | 0.3Ω | 2.7 | 11 | 7.2 | 0.6Ω | 245 V |
| Version 2 1 turn secondary | 2.0 µH | 3.2Ω | 1.4 | 1.0 | 6.7 | 1.4Ω | 310 V |
| Version 2 2 turn secondary | 2.0 µH | 3.2Ω | 1.4 | 3.0 | 3.6 | 1.4Ω | 200 V |
| Version 3 1 turn secondary | 1.0 µH | 1.1Ω | 1.8 | 2.9 | 5.8 | 1.1Ω | 250 V |
| Version 3 2 turn secondary | 1.1 µH | 1.1Ω | 1.8 | 8.4 | 6.1 | 0.6Ω | 200 V |

It is noted that the primary input voltage calculated for an 1800 watt heater ran from 200 volts to 310 volts. If a single turn primary were used the turns ratio would be reduced by a factor of 4 and each of the calculated voltages would be halved, providing 100 volts in two of the units with a device that was not optimized in design. Thus the theories underlying the present invention are proven.

Many variations and modifications of the above-described embodiments are within the ordinary skill of the skilled artisan in this art, without departing from the scope of the invention. For example, heater wires with cross sectional shapes other than round may also be used. Accordingly those modifications and embodiments are intended to fall within the scope of the invention as defined by the following claims.

What is claimed is:

1. A heater system comprising
a coupling member for producing fusion of members one to the other,
an eddy current, temperature self-regulating heater incorporated with said coupling member and having a regulated temperature to heat said member to fusion temperature below a temperature damaging to said coupling member,
said heater being comprised of a metallic structure which provides substantial resistance heating from skin effect when operated at high frequency,
a transformer having a soft magnetic core and primary and secondary windings disposable on said core,
means coupling said secondary winding to said heater structure,
said heater structure alone having a Q of between 0.5 and 5, said secondary winding having a reactance such that the ratio of its reactance to the resistance of the heater structure is between 1 and 20
a tool for applying heat to a load including at least said transformer core and said primary winding, and
means for connecting said primary winding to a source of high frequency current.

2. A heater system according to claim 1 wherein said heater winding is a bifilar winding.

3. A heater system according to claim 2 wherein said bifilar winding comprises
at least two pairs of a plurality of substantially parallel wires interconnected at spaced points along their paths,
said pairs interconnected to provide bifilar windings.

4. A heater system according to claim 3 where interconnection of parallel wires comprises
a plurality of individual cross members connected to each of the parallel wires.

5. A heater system according to claim 3 wherein interconnection of parallel wires is provided by having one of said parallel wires cross the other of the parallel wires at spaced points along said parallel wires.

6. A heater system according to claim 1 wherein
said secondary winding is permanently connected to said heater, and
said secondary winding when said heater is to be energized is disposed on said core.

7. A heater system according to claim 1 wherein
said secondary winding is permanently connected to said heater, and
said secondary winding may be at will closely coupled to said primary winding.

8. A heater system according to 7 wherein
said secondary winding is permanently wound on a short length of said core separable from the remainder of said core,
said short length of core being snugly received in a leg of said core on which said primary winding is wound.

9. A heater system according to claim 7 wherein
said transformer core has a generally rectangular configuration with one leg hinged to the remainder of the core,
said one leg being movable away from its adjacent leg such that said adjacent leg may be inserted into said secondary winding and said one leg returned to a position completing the magnetic path through the core.

10. A heater system according to claim 9 wherein said primary winding is disposed on said adjacent leg.

11. A heater system according to claim 9 comprising means to minimize saturation of said core.

12. A heater system according to claim 7 wherein said means is a gap between the movable and adjacent legs.

13. A heater system according to claim 1 wherein the Q of said heater system is defined by the equation $$Q = \frac{Q_2^2 + Q_3^2 + 2Q_2Q_3 + 1}{K^2 Q_2} - Q_2 - Q_3$$

wherein $Q_2$ is the Q of the secondary winding, $Q_3$ is the Q of the heater and K is the coupling factor between primary and secondary windings.

14. A heater system according to claim 1 wherein said primary and secondary windings are on the same leg of the transformer core.

* * * * *